United States Patent [19]
Gray et al.

[11] 3,931,534
[45] Jan. 6, 1976

[54] MAIN FRAME AND CENTER CLAMP FOR A VIBRATING MOTOR

[75] Inventors: William R. Gray, Joplin, Mo.; Henry A. Kahrmann, Jr., Columbus; Ming K. Shieh, Westerville, both of Ohio

[73] Assignee: Dresser Industries, Inc., Dallas, Tex.

[22] Filed: Apr. 12, 1974

[21] Appl. No.: 460,508

[52] U.S. Cl. ............................ 310/29; 198/220 DC
[51] Int. Cl.² ...................................... H02K 33/02
[58] Field of Search .......... 198/220 DC; 310/29, 28, 310/15, 21, 22

[56] References Cited
UNITED STATES PATENTS

| | | | |
|---|---|---|---|
| 2,356,961 | 8/1944 | Weyandt | 198/220 DC |
| 3,155,853 | 11/1964 | Spurlin et al. | 310/29 |
| 3,167,670 | 1/1965 | Spurlin | 310/29 |
| 3,170,078 | 2/1965 | Kuschel | 310/29 |

*Primary Examiner*—Donovan F. Duggan
*Attorney, Agent, or Firm*—John M. Lorenzen

[57] ABSTRACT

A vibrating motor comprising a main frame and a center clamp between which the vibrator bars are secured for relative vibration of the main frame and the center clamp. Each of the main frame and the center clamp are formed as a fabricated construction of metal plate elements that are secured to each other in the respective assemblies by welding. Each of the main frame and the center clamp that is constructed in this manner is sufficiently rigid to securely hold the vibrator bars and their spacers.

20 Claims, 7 Drawing Figures

MAIN FRAME AND CENTER CLAMP FOR A VIBRATING MOTOR

BACKGROUND OF THE INVENTION

1. Field of the Invention

This invention relates to vibrating motors, and more particularly to a novel construction of a main frame and center clamp for vibrating motors.

2. Description of the Prior Art

The vibrating motors to which this invention relates are characterized by a main frame and a center clamp with a stack of vibrator bars interposed between the main frame and the center clamp. The opposite ends of the vibrator bars are fixedly secured to the main frame, and the center clamp is fixedly secured to the vibrator bars at a position intermediate the opposite ends thereof. The stack of vibrator bars secured in this manner to the main frame and to the center clamp constitute the flexible element in the vibrating motor, which permits the relative vibratory movement of the main frame and the center clamp.

In the main frame there is a stator, which is an electromagnet, that is alternately energized and de-energized, to periodically magnetically excite the stator. In the center clamp there is an armature that is disposed opposite the stator, with a small air gap between the stator and the armature. When the stator is energized, during one-half period of magnetic excitation, the armature and the center clamp are drawn towards the stator, flexing the vibrator bars in the direction of the stator. When the stator is de-energized, during the other half period when the stator is not magnetically excited, the armature and the center clamp are released from the magnetic force, whereby the vibrator bars spring back and flex in the opposite direction. Such alternate flexing action of the spring bars produces the vibration of the main frame and the center clamp relatively to each other.

In a typical construction of the vibrating motor, the main frame is made as the heavy element, which is relateively heavier than the center clamp and the part to which the center clamp is attached. A typical use of a vibrating motor is for a vibrating feeder, in which there is a feeding trough attached to the center clamp, and this feeding trough with the material that is in the trough then becomes part of the vibrated mass.

It has been customary to form the main frame and the center clamp as relatively heavy castings to provide the desired strength and rigidity, and also to form the main frame as the relatively heavier element of the assembly, whereby the vibration will manifest itself in the vibration of the center clamp and the working element which is secured to the center clamp. In the case of the vibrating feeder, the feeder trough is secured to the center clamp and is the working element. Such a construction is illustrated in the patent to Weyandt, U.S. Pat. No. 2,356,961, issued Aug. 29, 1944, for Vibratory Electric Motor. In this patent the main frame is formed as a massive casting, and the center clamp similarly is formed as a casting in the typical manner of the construction of such vibrating motors.

SUMMARY OF THE INVENTION

In accordance with this invention, it is an object to provide a main frame construction and a center clamp construction for a vibrating motor which are of relatively lighter weight and greater strength than the typical main frame and center clamp constructions which have been used for such motors. Such improved main frame and center clamp constructions are formed of metal plate elements, rather than as massive castings. The metal plate elements are joined in the assembly of the main frame and in the assembly of the center clamp by welding, to form these as rigid structures of sufficient strength and rigidity to securely hold the vibrator bars which are interposed between the main frame and the center clamp.

It is another object of the invention to provide an improved main frame and center clamp construction in which these parts are made of a fabricated construction with sufficient strength and rigidity to securely hold the vibrator bars.

It is still another object of the invention to provide an improved main frame and center clamp construction in which these parts are constructed of metal plate elements that are secured to each other in the respective assemblies by welding.

It is yet another object of the invention to provide an improved fabricated main frame construction in which there is a frame element which is the principal supporting element for a seat block and a clamping block between which the vibrator bars of the vibrating motor are fixedly secured.

It is still another object of the invention to provide an improved construction of the center clamp in which there is a principal frame element for holding the seat block and the clamping block between which the vibrator bars of the vibratory motor are disposed and by which the center clamp is fixedly secured to the vibrator bars.

Other objects of the invention will appear hereinafter, the novel features and combinations being set forth in the appended claims.

DESCRIPTION OF THE PREFERRED EMBODIMENT

Figure 1:
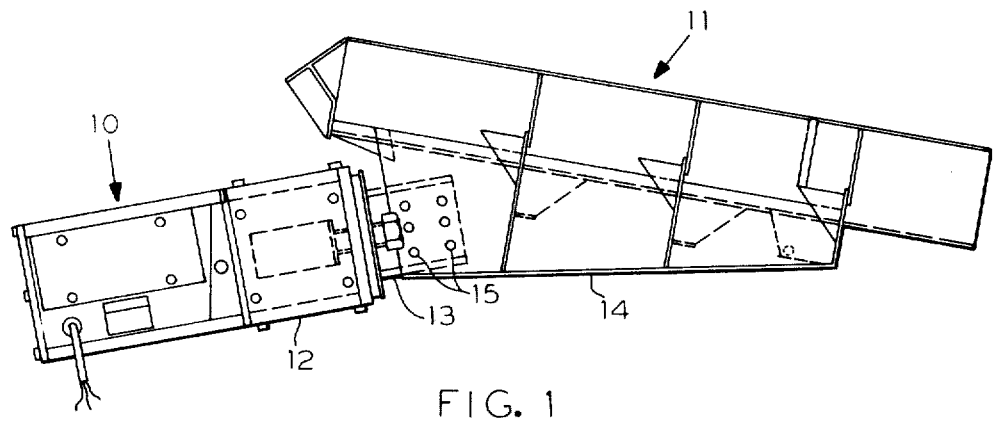
FIG. 1 is a side elevational view of a vibrating feeder, which includes a vibrating motor attached to the feeding trough.

There is illustrated in FIG. 1 a vibrating feeder comprising a vibrating motor 10 and a feeding trough 11. The vibrating motor 10, has a main frame 12 and a center clamp 13, the latter being secured to the feeding trough 11. There is a sub-frame 14 on the underside of the feeding trough 11, and the center clamp 13 extends into the sub-frame 14 and is secured to the latter by a plurality of bolts 15, 15.

Figure 2:
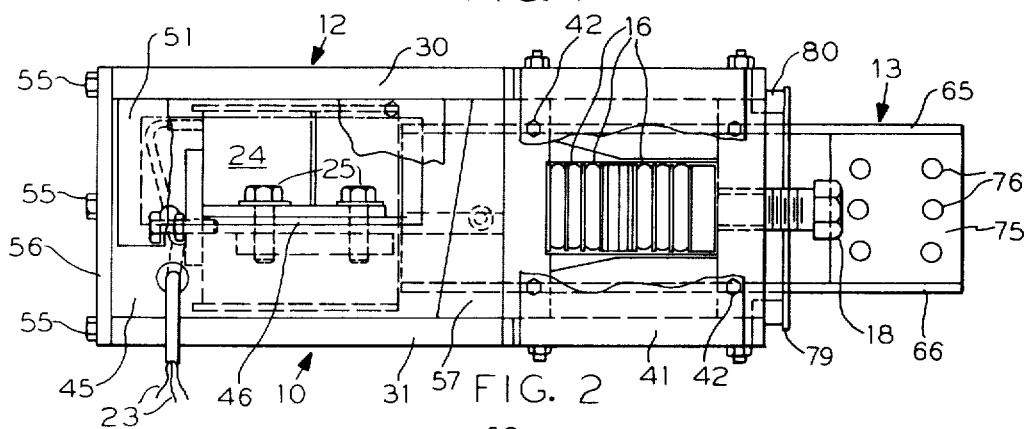
FIG. 2 is a side elevational view of the vibrating motor of FIG. 1, with the side of the vibrating motor being partially open.
Figure 3:
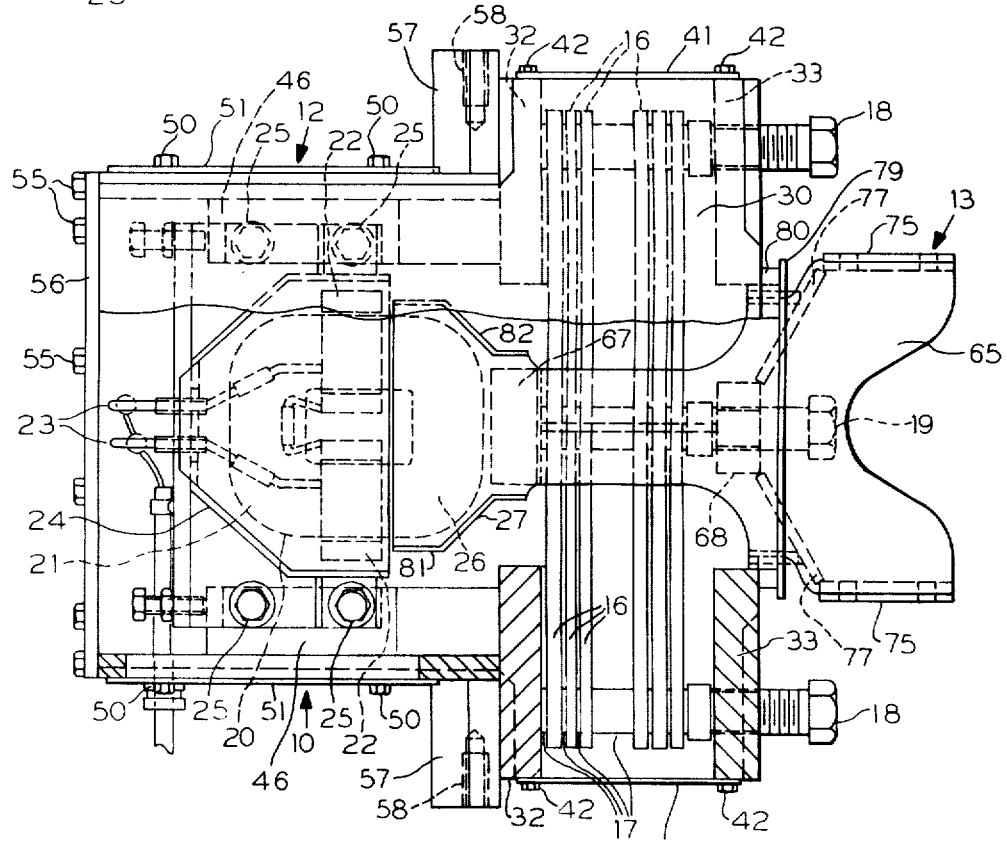
FIG. 3 is a plan view of the vibrating motor illustrated in FIG. 2, with the top of the vibrating motor being partially open.

There is a more detailed illustration of the vibrating motor 10 in FIGS. 2 and 3. The main frame 12 and the center clamp 13 are connected by a plurality of vibrator bars 16, 16 which are arranged in a stack with suitable spacer elements 17, 17 between the individual vibrator bars 16, 16. The spacer elements 17, 17 provide suitable spacing between the individual vibrator bars 16, 16 to permit these to flex back and forth to provide the vibrating action of the main frame 12 and the center clamp 13 relatively to each other.

The opposite ends of the vibrator bars 16, 16 are fixedly secured in the main frame 12 by locking screws 18, 18 at opposite sides of the main frame 12. The center clamp 13 is secured to the stack of vibrator bars 16, 16 at a position mid-way between the ends thereof, and the center clamp 13 is fixedly secured to the vibrator bars 16, 16 by a locking screw 19 which is turned down against the vibrator bars 16, 16, with suitable spacer elements 17, 17 therebetween.

In the main frame 12 there is a stator 20 which comprises a core 21 made of magnetically permeable material, and coils 22, 22 on the poles of the core 21. The coils 22, 22 are alternately energized to periodically magnetize the core 21, and de-energized to periodically demagnetize the core 21. Current is supplied to the coils 22, 22 by electrical leads 23, 23. The stator 20 is contained within a housing 24 that is secured in the main frame 12 by a plurality of bolts 25, 25 on opposite sides of the main frame 12.

The center clamp 13 has an armature 26 which is disposed opposite the stator 20, with a small air gap separating the stator 20 and the armature 26. The armature 26 is made of magnetically permeable material so as to be attracted to the stator 20 when it is magnetized, and released from the stator 20 when it is demagnetized. The armature 26 is disposed within a housing 27 formed at the rear end of the center clamp 13.

When the armature 26 is attracted to the stator 20, the vibrator bars 16, 16 are flexed in the direction of the stator 20. When the armature 26 is released from the stator 20, the vibrator bars 16, 16 are free to flex in the opposite direction. Such alternate action of the stator 20 and the armature 26 produces the back and forth flexing movement of the vibrator bars 16, 16 in the vibrating motor 10. This in turn produces the relative vibrating movement of the main frame 12 and the center clamp 13. The main frame 12 is made as a relatively heavier element than the center clamp 13, whereby the principal vibrating movement manifests itself in the center clamp 13 and the working element which is attached to the latter, which may be a feeding trough 11 of a vibrating feeder, or another vibrating element. By the vibrating movement of the feeding trough 11, the material which is delivered to the feeding trough 11 is regularly fed along the length thereof and discharged from the open end of the feeding trough 11.

Figure 4:
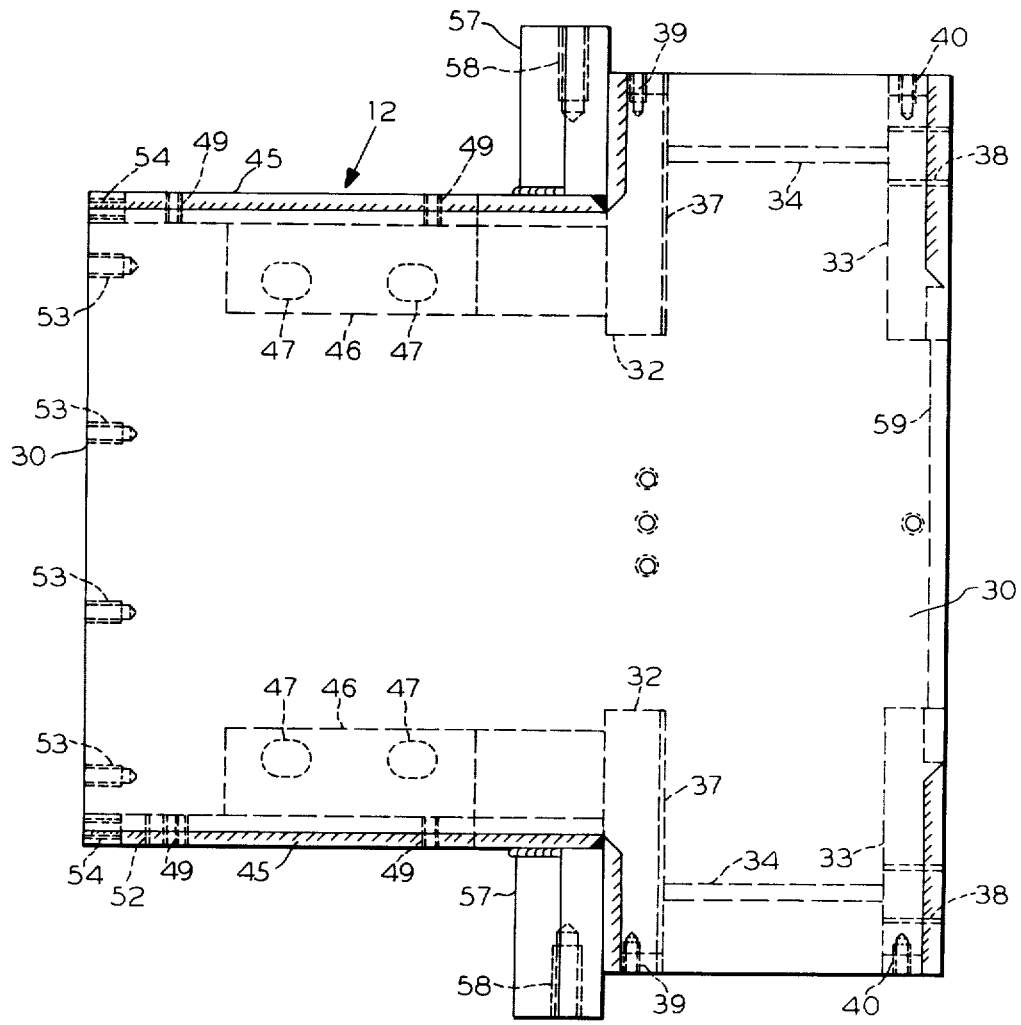
FIG. 4 is a plan view of the main frame of the vibrating motor.
Figure 5:
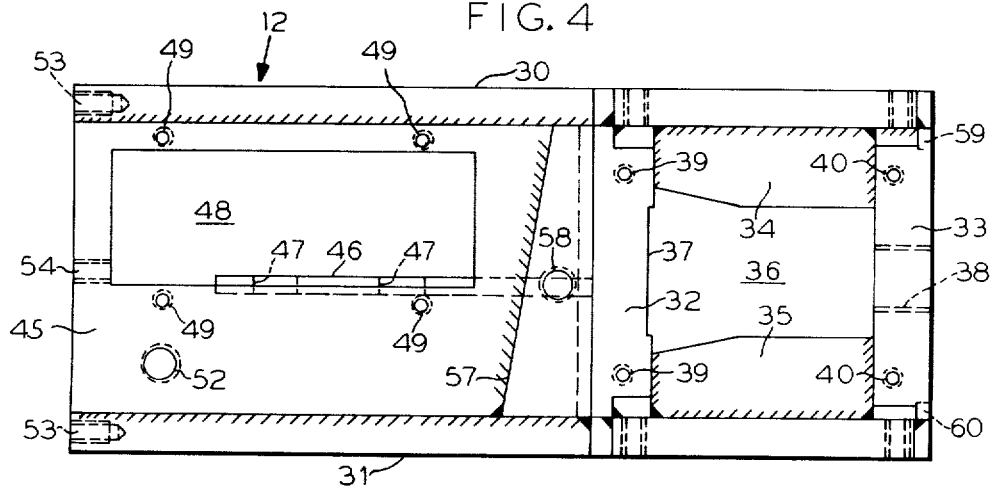
FIG. 5 is a side elevational view of the main frame of the vibrating motor.

The main frame 12 is of a fabricated construction of metal plate elements as best illustrated in FIGS. 4 and 5. There is an upper frame element 30 and a lower frame element 31 which are of the same configuration and are spaced from each other. Each of the frame elements 30, 31 is of a somewhat T configuration as seen in FIG. 4. The vibrator bars 16, 16 are secured in the arms of the T configured frame elements 30, 31, while the stator 20 is disposed in the leg of the T configured frame elements 30, 31. The main frame 12 has the same construction at opposite sides thereof, as seen at the top and bottom of the illustration in FIG. 4, and therefore, the description will proceed with respect to one side only of the main frame 12, it being understood that the description applies as well to the opposite side.

There is an upright seating block 32 which stands between the upper and lower frame elements 30, 31. A clamping block 33 is spaced from the seating block 32 and also stands between the upper and lower frame elements 30, 31 at a position that is opposite the seating block 32. There is an upper spacer block 34 and a lower spacer block 35, which are spaced from each other and are interposed between the seating block 32 and the clamping block 33. The spacer block 34 stands against the upper frame element 30, and the spacer block 35 stands against the lower frame element 31. The upper and lower frame elements 30, 31, the seating block 32, the clamping block 33, and the spacer blocks 34, 35 are secured to each other in an assembly by welding these elements to each other as illustrated in the drawings, thus forming a rigid assembly of the elements.

The seating block 32, the clamping block 33, and the spacer blocks 34, 35 are spaced from each other so as to provide an opening 36 therebetween in which the ends of the vibrator bars 16, 16 are received. The seating block 32 has a recessed seat 37 machined in its surface against which the vibrator bars 16, 16 are disposed with suitable spacers 17, 17. The clamping block 33 is formed with a threaded opening 38 for the clamping screw 18. The clamping screw 18 is turned into the threaded opening 38 and bears against the stack of vibrator bars 16, 16 and the spacers 17, 17. By tightening up on the screw 18 the ends of the vibrator bars 16, 16 are securely clamped against the seating block 32. Threaded holes 39, 39 are tapped into the end of the seating block 32, and similarly threaded holes 40, 40 are tapped into the end of the clamping block 33 for securing a cover plate 41 over the opening 36 by a plurality of bolts 42, 42, as seen in FIG. 3.

Behind the seating block 32 and extending into the leg of the upper and lower frame elements 30, 31 there is an upright side wall 45, which extends rearwardly from the seating block 32. The side wall 45 is secured to the upper and lower frame elements 30, 31 by welding, as illustrated in the drawings, to form a rigid assembly. A shelf 46 extends laterally inwardly from the side wall 45 and is secured to the latter and to the seating block 32 by welding. The shelf is formed with elongated apertures 47, 47 for the bolts 25, 25 by which the stator 20 and its housing 24 are secured in the leg part of the main frame 12. The elongation of the apertures 47, 47 permits sliding adjustment of the position of the stator 20 to adjust the air gap between the stator 20 and the armature 26, the magnetic force between the stator 20 and the armature 26 being a function of the air gap. The side wall 45 has an opening 48 to provide access to the bolts 25, 25 for positioning the stator 20 and securing it in position. A plurality of threaded holes 49, 49 are tapped into the sidewall 45 to receive the bolts 50, 50 by which a cover 51 is secured over the opening 48 to close the latter. There is also an opening 52 in one side wall 45 through which the electrical leads 23, 23 are directed to the stator 20.

At the rear of the main frame 12, the upper and lower frame elements 30, 31 are provided with threaded holes 53, 53, and at the rear of each sidewall 45 there is a threaded hole 54, all for the reception of the plurality of bolts 55, 55 by which an end plate or cover 56 is secured to the end of the main frame 12 to close the latter. The several covers 41, 51, 56 provide a means for closing the main frame 12 and sealing the latter. This prevents the entrance of dust and other contaminating materials into the main frame 12 which could affect the operation of the elements. It may also provide an electrically permissable construction where this is required, as in some mining applications.

There is also an upright post 57 which is secured by welding, as illustrated in the drawings, in the corner between the seating block 32 and the sidewall 45. Approximately midway in the height of the post 57 there is a threaded opening 58 in which there may be secured any eye bolt or similar element to provide an element to lift the main frame 12, or to suspend or otherwise to support the main frame 12 and the vibrating motor 10. At the front of the main frame 12 there is a strip 59 below the upper frame element 30 and extending between the clamping blocks 33, 33 that is secured in place by welding. There is another strip 60 above the lower frame element 31 and between the clamping blocks 33, 33 which is also secured in place by welding. The strips 59, 60 provide an additional surface area for a seal between the center clamp 13 and the main frame 12, as will be explained hereinafter.

Figure 6:
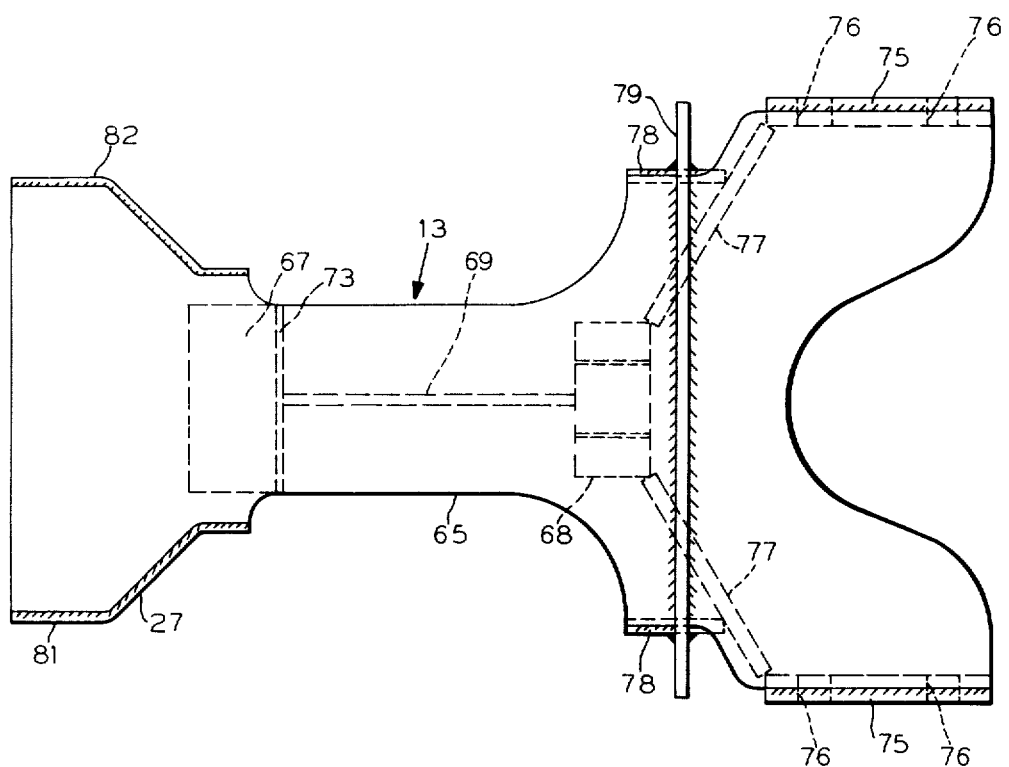
FIG. 6 is a plan view of the center clamp of the vibrating motor.
Figure 7:
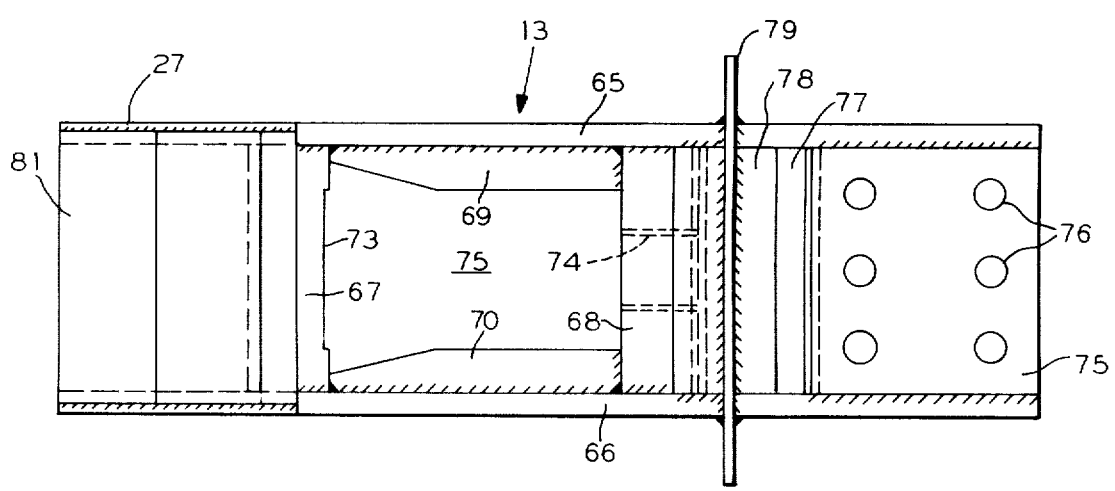
FIG. 7 is a side elevational view of the center clamp.

The center clamp 13 is illustrated in FIGS. 6 and 7, and is of a fabricated construction made of metal plate elements. The center clamp 13 has an upper frame element 65 and a lower frame element 66, which have the same configuration and are disposed opposite each other in spaced disposition. In the intermediate part of the center clamp 13, and between the upper and lower frame elements 65, 66 there is a seating block 67 against which the vibrator bars 16, 16 and the spacers 17, 17 are disposed. There is a clamping block 68 which is opposite the seating block 67 and is spaced from the latter. The seating block 67 and the clamping block 68 stand between the upper and lower elements 65, 66. There is an upper spacer block 69 and a lower spacer block 70, which extend between the seating block 67 and the clamping block 68 to space the latter from each other. The spacer block 69 stands against the upper frame element 65, and the spacer block 70 stands against the lower frame element 66. The upper and lower frame elements 65, 66, the seating block 67, the clamping block 68, and the spacer blocks 69, 70 are secured in the assembly by welding the parts to each other.

The seating block 67 has a recessed seat 73, which is machined in the surface of the seating block 67, to provide the seat for the vibrator bars 16, 16 and the spacer 17, 17. In the clamping block 68 there is a threaded opening 74 for the clamping screw 19 by which the center clamp 13 is firmly secured to the vibrator bars 16, 16. Between the seating block 67 and the clamping block 68 and the spacer blocks 69, 70 there is an opening 75 through which the vibrator bars 16, 16 extend.

The forward end of the center clamp 13, which is seen to the right in FIGS. 6 and 7, is a widened part of the center clamp 13 for attachment to the working element that is to be vibrated. At each side of the center clamp 13 there is an upright plate 75 which stands between the upper and lower frame elements 65, 66, and is secured to the latter by welding the parts to each other. Each plate 75 is formed with a plurality of apertures 76, 76, which may be six in number, for the reception of the bolts 15, 15 by which the center clamp 13 may be attached to the vibrated working element, such as the feeding trough 11 illustrated in FIG. 1. Behind each upright plate 75 there is another plate member 77 which extends diagonally from the upright plate 75 to the clamping block 68. The plate members 77 are structural elements, and also function to close off an access area to the vibrating motor 10 through which dust and other contaminants might enter the vibrating motor 10. There is yet another plate member 78 at each side of the center clamp 13 which stands between the upper and lower frame elements 65, 66 and is secured to the latter by welding. The plate members 78, 78 are also secured to the respective plate members 77, 77 by welding, and extend rearwardly therefrom.

There is a perimetal plate 79 which surrounds the upper and lower frame elements 65, 66, and the plate members 78, 78 for the purpose of a seal 80 between the main frame 12 and the center clamp 13. This seal 80 is best illustrated in FIGS. 2 and 3. The seal 80 is a perimetal seal which is disposed between the perimetal plate member 79 and the adjacent parts of the main frame 12, the latter including the edges of the clamping blocks 33, 33, the ends of the upper and lower frame elements 30, 31, and the aforementioned strips 59, 60, as best seen in FIGS. 4 and 5. It will thus be seen that the main frame 12 is completely enclosed and sealed. The seal 80 is of a substantial thickness and resilience so that it does not in any way impede the relative vibrating movement of the main frame 12 and the center clamp 13.

At the rear of the center clamp 13 there is a housing 27 for the armature 26. The housing 27 is formed by a widened part of each of the upper and lower frame elements 65, 66 at the rear of the center clamp 13. There are plates 81, 82 at opposite sides of the center clamp 13 which are bent to the widened configuration of the upper and lower frame elements 65, 66 and are secured to the latter by welding, thereby to form an enclosure between the upper and lower frame elements 65, 66 and the plates 81, 82 that is the housing 27 for the armature 26.

The main frame 12 and the center clamp 13 are thus formed of a fabricated construction of metal plate elements that are welded to each other. The main frame 12 and the center clamp 13 are of a sufficiently rigid construction to securely hold the vibrator bars 16, 16 and the spacers 17, 17. The main frame 12 is made to be heavier than the center clamp 13 and the working element that is attached to the center clamp 13 so that the relative vibration will manifest itself in the center clamp 13 and the working element.

Obviously, those skilled in the art may make various changes in the details and arrangements of parts, without departing from the spirit and scope of the invention as defined by the claims hereto appended, and applicant, therefore, wishes not to be restricted to the precise construction herein disclosed.

Having thus described and shown an embodiment of the invention, what it is desired to secure by Letters Patent of the United States is:

1. A vibrating motor comprising a main frame; a center clamp; a leaf spring between said main frame and said center clamp for vibration of said main frame and said center clamp relatively to each other, said main frame having means to secure each end of said leaf spring to the main frame including, a seat block for each end of said leaf spring, a clamping block spaced opposite said seat block, a spacer block between said seat block and said clamping block, and clamping means in said clamping block to clamp said one end of the leaf spring against said seat block, wherein said seat block, said clamping block and said spacer block are welded to an element of the main frame and form a rigid assembly for holding said end of the leaf spring in securely clamped position; and means to secure said center clamp to said leaf spring intermediate the ends thereof.

2. A vibrating motor as recited in claim 1 including upper and lower spacer blocks which are spaced from each other to provide an opening between the spacer blocks and between the seat block and the clamping block to receive said end of a leaf spring.

3. A vibrating motor as recited in claim 2 in which said frame element is an upper frame element that overlies the seat block, the clamping block and said upper spacer block, and a lower frame element opposite the upper frame element that overlies the seat block, the clamping block and said lower spacer block.

4. A vibrating motor as recited in claim 3 including a cover secured to said seat block, said clamping block, said upper frame element and said lower frame element to close the main frame at the end of the leaf spring.

5. A vibrating motor as recited in claim 3 in which said upper frame element and said lower frame element each extend rearwardly from said seat block, and means in the rearwardly extending parts of said upper and lower frame elements to hold a stator.

6. A vibrating motor as recited in claim 5 including a side wall secured to the rearwardly extending parts of said upper and lower frame elements and an inwardly extending shelf on the side wall to hold the stator.

7. A vibrating motor as recited in claim 2 in which each of said block, clamping block and upper and lower spacer blocks is formed of a plate, said frame element is formed of a plate that overlies the seat block, the clamping block and the upper spacer block, a second frame element that is opposite the first said frame element and is formed of a plate that overlies the seat block, the clamping block and the lower spacer block, and welding to secure each of said seat block, clamping block, upper and lower spacer blocks, first frame element and second frame element to each other in a rigid assembly.

8. A vibrating motor as recited in claim 1 in which said clamping means comprises a screw that is threaded through the clamping block and bears against the leaf spring.

9. A vibrating motor as recited in claim 1 including a plurality of leaf springs disposed in a stack, upper and lower elongated spacer blocks which are spaced from each other to provide an elongated opening between the spacer blocks and between the seat block and the clamping block to receive the ends of the stacked leaf springs.

10. A vibrating motor as recited in claim 9 in which said leaf springs extend transversely to opposite sides of the main frame, and said seat block, clamping block and spacer blocks are at each side of the main frame to secure the opposite ends of the leaf springs.

11. A vibrating motor as recited in claim 1 in which each of said seat block, clamping block and spacer block is formed of a plate, and said frame element is formed of a plate that overlies the seat block, the clamping block and the spacer block, and welding to secure each of said seat block, clamping block, spacer block and said frame element to each other in a rigid assembly.

12. A vibrating motor as recited in claim 2 in which said seat block, said clamping block, said upper spacer block and said lower spacer block are at each side of the main frame for the opposite ends of the leaf springs, said frame element is an upper frame element that overlies the seat block, the clamping block and the upper spacer block at opposite sides of the main frame, a lower frame element that overlies the seat block, the clamping block and the lower spacer block at opposite sides of the main frame, said upper and lower frame elements extending rearwardly from said seat blocks, a side wall at each side of the rearwardly extending parts of the upper and lower frame elements, and a shelf extending inwardly from each side wall to support a stator in the main frame between said side walls and between the rearwardly extending parts of the upper and lower frame elements.

13. A vibrating motor comprising a main frame; a center clamp, a leaf spring between said main frame and said center clamp for vibration of said main frame and said center clamp relatively to each other; means to secure said center clamp to said leaf spring intermediate the ends thereof including, a seat block for each leaf spring, a clamping block spaced opposite said seat block, a spacer block between said seat block and said clamping block, and clamping means in said clamping block to clamp said leaf spring against said seat block, wherein said seat block, said clamping block and said spacer block are welded to a frame element of the center clamp to form a rigid assembly for holding the leaf spring in securely clamped position; and means on said main frame to secure each end of said leaf spring to the main frame.

14. A vibrating motor as recited in claim 13 including upper and lower spacer blocks which are spaced from each other to provide an opening between the spacer blocks and between the seat block and the clamping block to receive the leaf spring.

15. A vibrating motor as recited in claim 14 in which each of said seat block, clamping block and upper and lower spacer blocks is formed of a plate, said frame element is formed of a plate that overlies the seat block, the clamping block and the upper spacer block, a second frame element that is opposite the first said frame element and is formed of a plate that overlies the seat block, the clamping block and the lower spacer block, and welding to secure each of said seat block, clamping block, upper and lower spacer blocks, first frame element and second frame element to each other in a rigid assembly.

16. A vibrating motor as recited in claim 14 in which said frame element is an upper frame element that overlies the seat block, the clamping block and said upper spacer block, and a lower frame element opposite the upper frame element that overlies the seat block, the clamping block and said lower spacer block.

17. A vibrating motor as recited in claim 16 in which said upper frame element and said lower frame element each extend rearwardly from said seat block, and means in the rearwardly extending parts of said upper and lower frame elements to hold an armature.

18. A vibrating motor as recited in claim 13 in which said clamping means comprises a screw that is threaded through the clamping block and bears against the leaf spring.

19. A vibrating motor as recited in claim 13 including a plurality of leaf springs disposed in a stack, upper and lower elongated spacer blocks which are spaced from each other to provide an elongated opening between the spacer blocks and between the seat block and the clamping block to receive the stacked leaf springs.

20. A vibrating motor as recited in claim 13 in which each of said seat block, clamping block and spacer block is formed of a plate, and said frame element is formed of a plate that overlies the seat block, the clamping block and the spacer block, and welding to secure each of said seat block, clamping block, spacer block and said frame element to each other in a rigid assembly.

* * * * *

UNITED STATES PATENT OFFICE
CERTIFICATE OF CORRECTION

Patent No. 3,931,534  Dated January 6, 1976

Inventor(s) William R. Gray, et al.

It is certified that error appears in the above-identified patent and that said Letters Patent are hereby corrected as shown below:

Column 7, line 34, "each of said block" should read -- each of said seat block, --.

Signed and Sealed this thirtieth Day of March 1976

[SEAL]

Attest:

RUTH C. MASON
*Attesting Officer*

C. MARSHALL DANN
*Commissioner of Patents and Trademarks*